(No Model.)
J. B. & W. A. McMECHAN.
HITCHING STRAP.
No. 261,467. Patented July 18, 1882.
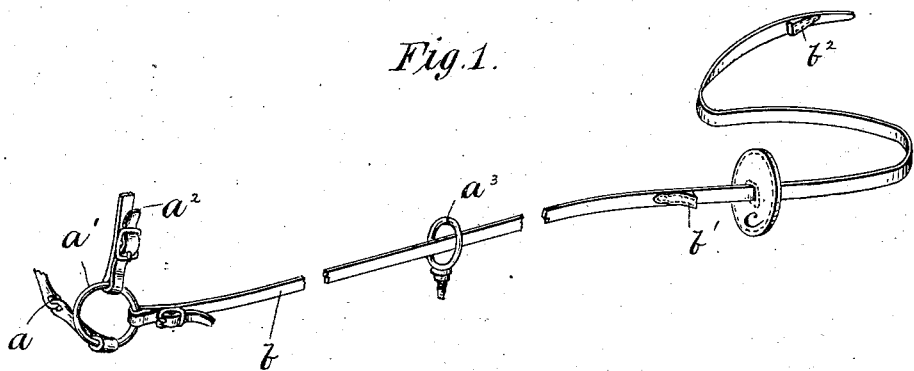
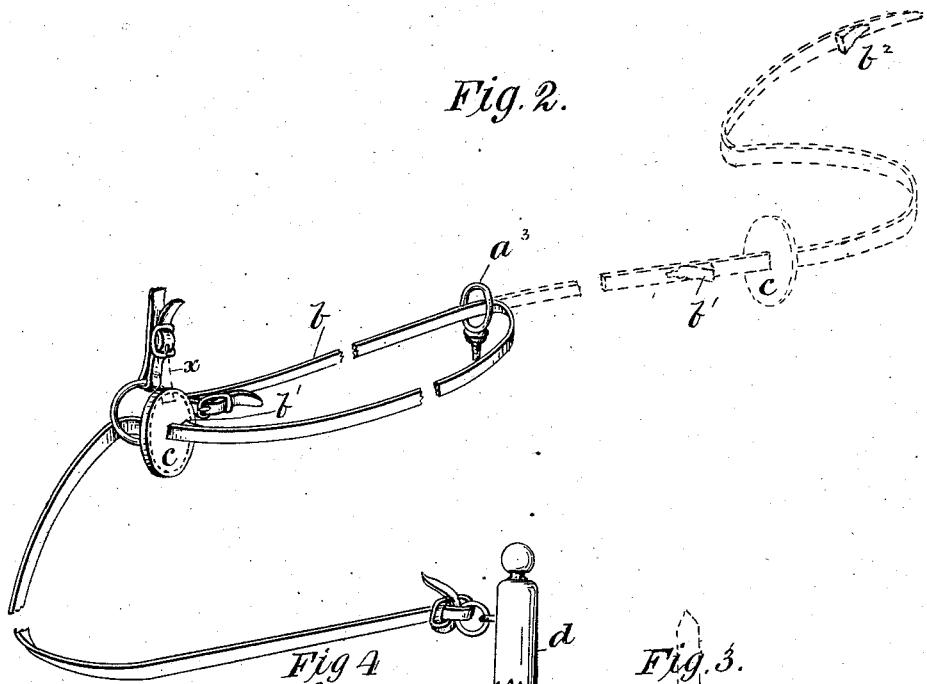
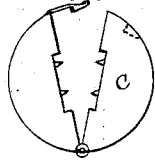
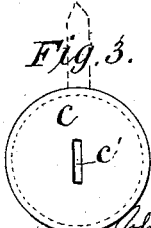
WITNESSES
P. B. Turpin,
T. N. Griffin
INVENTORS
John B. McMechan
William A. McMechan
By R. S. & A. P. Lacey
ATTORNEYS.

UNITED STATES PATENT OFFICE.

JOHN B. McMECHAN AND WILLIAM A. McMECHAN, OF ST. CLAIRSVILLE, OHIO.

HITCHING-STRAP.

SPECIFICATION forming part of Letters Patent No. 261,467, dated July 18, 1882.

Application filed May 15, 1882. (No model.)

*To all whom it may concern:*

Be it known that we, JOHN B. McMECHAN and WILLIAM A. McMECHAN, citizens of the United States, residing at St. Clairsville, in the county of Belmont and State of Ohio, have invented certain new and useful Improvements in Hitching-Straps; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in hitching-straps for horses, and has for its object to do away with the necessity of carrying the additional strap for hitching.

It consists essentially in the combination of the rein, sliding disk, and stops secured to the rein, all arranged and operating as hereinafter fully described, and specifically pointed out in the claim.

In the drawings, Figure 1 shows the line having button when used as a driving-rein, and in Fig. 2 we show it carried forward and used as a hitching-strap, as will be hereinafter fully described. Fig. 3 shows the button in detail, and Fig. 4 shows a modification hereinafter described.

$a$ represents bridle-bit, having ring $a'$. $a^2$ represents the side strap to bridle. $a^3$ represents one of the rings on the saddle.

$b$ represents one of the driving-lines buckled to bit-ring $a'$ and extended back through ring $a^3$ into the vehicle.

$b'$ is a stop or lug secured to line $b$ about the same distance in rear of ring $a^3$ as the latter is distant from ring $a'$. The object of this lug is to hold the button hereinafter described from slipping back on line when the said line is carried forward into the position shown in Fig. 2, as will be described.

$b^2$ is a stop arranged near or on the end of the rein to prevent the button from falling from the rein.

$c$ is a button, made slightly larger than the ring $a'$. We preferably make this button of sole-leather cut into circular form, as shown. It will be understood, however, that this button may be made of any other shape desired, and formed of wood, metal, bone, or equivalent substance.

Through the center of button $c$ we cut a slit, $c'$, large enough to receive the line $b$. This button is placed on the line between the stops or lugs $b'$, and may be slipped along the line from one to the other of these lugs, as will be described.

$d$ represents the hitching-post.

In Fig. 4 we show a disk or button split and hinged at one end and arranged to clamp the rein. This button could be carried in the bottom of the wagon or in the driver's pocket and clamped on the line when desired to tie the horse. We prefer, however, the construction shown in Figs. 1, 2, and 3, hereinbefore described.

We will now describe the operation of our invention. In driving it will be understood the end of line $b$ is buckled to end of the other line of reins. When it is desired to hitch the horse line $b$ is unbuckled from the other line. The button $c$ is then slipped up against stop $b'$, and the end of line $b$ is carried forward and passed through ring $a'$, as shown in Fig. 2, until the button $c$ reaches the ring. The line is then stopped from passing through ring $a'$, and that portion of the line in front of button $c$ is carried and secured to post $d$.

In driving the button $c$ is slipped back to stop $b^2$ at the end of line, as if left up against stop $b'$ it would be in the way of the driver's hands, and also would rub against dash-board of the vehicle. Hence we preferably construct the button so it will slide along the line between the stops $b'$ $b^2$.

It will be understood that instead of having the button sliding on the line it might be secured to the bit-ring; also, that any ordinary clamping device might be connected with the bit-ring, so that the line could be passed through the latter, as hereinbefore described, and clamped at the proper point to provide a hitching-strap, as described.

The disk $c$ could be provided with a lug and suspended to the head-strap of the bridle, so as to be in position at the bit-ring, as shown in dotted lines at $x$, Figs. 2 and 3. In such arrangement the stop $b^2$ is left off the line and the latter is carried forward and slipped through the opening $c$ and bit-ring.

Having thus described our invention, what we claim, and desire to secure by Letters Patent, is—

The combination, with the rein $b$ and the button $c$, having slot $c'$, and placed upon and sliding freely to and fro on the rein $b$, of the stops $b'$ $b^2$, made fast to the rein $b$, the stop $b^2$ being located at the free end of the rein, and the stop $b'$ being located at such distance from the free end of the rein as to provide sufficient length of rein for a hitching-strap, substantially as set forth.

In testimony whereof we affix our signatures in presence of two witnesses.

JOHN B. McMECHAN.
WILLIAM A. McMECHAN.

Witnesses:
JAMES A. BARNES,
W. H. CARSON.